United States Patent [19]
Hull et al.

[11] Patent Number: 6,153,958
[45] Date of Patent: Nov. 28, 2000

[54] BEARING DESIGN FOR FLYWHEEL ENERGY STORAGE USING HIGH-TC SUPERCONDUCTORS

[75] Inventors: John R. Hull, Hinsdale; Thomas M. Mulcahy, Western Springs, both of Ill.

[73] Assignee: The University of Chicago, Chicago, Ill.

[21] Appl. No.: 08/247,566

[22] Filed: May 23, 1994

[51] Int. Cl.[7] ..................................................... H02K 7/09
[52] U.S. Cl. ............................................ 310/90.5; 310/90
[58] Field of Search .......................... 310/90, 90.5; 505/1

[56] References Cited

U.S. PATENT DOCUMENTS

| | | | |
|---|---|---|---|
| 4,132,130 | 1/1979 | Schneider . | |
| 4,886,778 | 12/1989 | Moon et al. | 505/1 |
| 4,939,120 | 7/1990 | Moon et al. | 505/1 |
| 4,961,352 | 10/1990 | Downer et al. | 74/546 |
| 5,126,317 | 6/1992 | Agarwala | 505/1 |
| 5,159,219 | 10/1992 | Chu et al. | 310/90.5 |
| 5,214,981 | 6/1993 | Weinberger et al. | 74/573 |
| 5,436,516 | 7/1995 | Yamazaki et al. | 310/90.5 |

OTHER PUBLICATIONS

Dantam, K. Rao, "Magnetic Bearing Concepts for Turbomolecular Pumps", Technical Bulletin No. C–1022, Jun. 1993.

"Satellite Power Using a Magnetically Suspended Flywheel Stack," Kirk et al., *Journal of Power Sources*, vol. 22 (1988), pp. 301–311.

"Magnetic Forces in High–$T_c$ Superconducting Bearings," Moon, *Applied Electromagnetics in Materials*, vol. 1 (1990), pp. 29–35.

"High–Speed Rotation of Magnets on High $T_c$ Superconducting Bearings," Moon, et al., *Appl. Phys. Lett.*, vol. 56(4), Jan. 22, 1990, pp. 397–399.

"Rotor Dynamics of Flywheel Energy Storage Systems," Jayaraman, et al, *Journal of Solar Energy Engineering*, vol. 113, Feb. 1991, pp. 11–18.

"A New Process with the Promise of High $J_c$ in Oxide Superconductors," Murakami, et al., *Japanese Journal of Applied Physics*, vol. 28, No. 7, Jul. 1989, pp. 1189–1194.

"Levitation Forces, Relaxation and Magnetic Stiffness of Melt–Quenched $YBa_2Cu_3O_x$," Moon, et al., *Japanese Journal of Applied Physics*, vol. 29, No. 7, Jul. 1990, pp. 1257–1258.

"Materials Research Issues in Superconducting Levitation and Suspension as Applied to Magnetic Bearings," F.C. Moon and J.R. Hull, Proceedings of the 25th Intersociety Energy Conversion Engineering Conference, vol. 3, Aug. 12–17, 1990, pp. 425–431.

"Amplitude Dependence of Magnetic Stiffness in Bulk High–Temperature Superconductors," Basinge et al, *Applied Physics Letter* 57(27) Dec. 31, 1990, pp. 2942–2944.

"Magnetic bearings using high–temperature superconductors: some practical considerations," Weinber et al, *Supercond. Sci. Technology* 3 (1990) pp. 381–388.

"Stability Projections for High Temperature Superconductors," Laquer et al, *IEEE Transactions On Magnetics*, vol. 25, No. 2, Mar. 1989.

"Levitation Force and Magnetic Stiffness In Bulk High–Temperature Superconductors," Chang et al, *J Appl. Phys.* 67 (9) May 1, 1990, pp. 4358–4360.

"Phenomenology of Forces Acting Between Magnets and Superconductors," Hull et al, Proceedings of the 25th Intersociety Energy Conversion Engineering Conference, vol. 3, Aug. 12–17, 1990, pp. 43437.

"Characterization of Composite High Temperature Superconductors For Magnetic Bearing Applications," Weinberger et al, Applied Superconductivity Conf., Snowmass Village, CO, Sep. 24–28, 19 Published Jan. 17, 1991.

*Primary Examiner*—Elvin Enad
*Attorney, Agent, or Firm*—Michael D. Rechtin; Foley & Lardner

[57] ABSTRACT

A high temperature superconductor material bearing system (38) This system (38) includes a rotor (50) having a ring permanent magnet (60), a plurality of permanent magnets (16, 20 and 70) for interacting to generate levitation forces for the system (38). This group of magnets are a push/pull bearing (75). A high temperature superconductor structure (30) interacts with the ting permanent magnet (60) to provide stabilizing forces for the system (38).

18 Claims, 5 Drawing Sheets

- ⟦◊⟧ PERMANENT MAGNET
- ⟦⊠⟧ SUPERCONDUCTOR
- ⟦╱⟧ MAGNETIC SHUNT
- ⟦≡⟧ NONMAGNETIC SUPPORT STRUCTURE

BEARING DESIGN FOR FLYWHEEL ENERGY STORAGE USING HIGH-TC SUPERCONDUCTORS

The United States Government has rights in this invention pursuant to Contract No. W-31-109-ENG-38 between the U.S. Department of Energy and The University of Chicago, representing Argonne National Laboratory.

BACKGROUND OF THE INVENTION

The present invention relates generally to magnetic bearing designs that incorporate high-temperature superconductors which are useful for flywheel energy storage. More particularly, the present invention relates to magnetic bearing designs utilizing a combination of permanent magnets and high temperature superconductors. The bearing designs are capable of large levitation pressure, low rotational loss, and the use of a wide variety of high temperature superconductors. An important feature in each of the designs is that a permanent magnet configuration is used to provide most of the levitation force, preferably in a geometry that is close to neutral equilibrium, so that the stiffnesses associated with this part of the bearing are small. The high temperature superconductor part of the bearing provides high stiffness but not necessarily high levitation pressure. When these bearings are used in flywheel energy storage devices, the efficiency of the flywheel can be very high and flywheels of this type become economic for diurnal energy storage and other applications where high energy efficiency is important. Further information relating to flywheel energy storage devices can be found in copending patent applications assigned to Argonne National Laboratory entitled "Optimization of Superconducting Tiling Pattern for Superconducting Bearings" and "Improved Permanent Magnet Design For High-Speed Superconducting Bearings."

Storage of electrical energy is useful in a number of applications. Diurnal storage of electricity is important to electric utilities in order to efficiently utilize base load generating plants and to meet the varying load demands of their customers. In this example, the baseload plants can charge the storage units at night when demand is low, and then peak demands can be met by discharging the storage units during the peak hours.

Energy storage can also play a substantial role in eliminating or postponing the installation of larger capacity power lines. Power can be transmitted at night to a substation or user energy storage unit when demand is low; and then during peak power times, the energy storage units can be discharged. The placement of energy storage units can occur in various parts of the electrical distribution system: utility parks where large amounts of energy can be stored; in tandem with photovoltaic or wind energy generation facilities that are time dependent; substation units; and individual companies and houses. Other potential applications for energy storage include use in electric vehicles such as cars and buses, and wayside energy storage for electric trains.

Flywheels are often considered for energy storage applications. Their primary advantages are modularity, high energy storage density (Wh/kg), and high efficiency input and output of electrical energy. The ability to produce high strength conventional flywheel rotors and the ability to efficiently transfer energy in and out of a flywheel are well known and will not be discussed herein.

The primary disadvantage of conventional flywheels is inefficiency in a standby mode. This inefficiency is caused by high rotational losses of the bearings that support the flywheel structure. High temperature superconductor bearings constructed in accordance with one form of the present invention substantially reduce rotational losses and enable standby losses in flywheels to be 0.1%/hr or less. These high temperature superconductor bearing designs provide passive stability in all directions, i.e., they provide a positive stiffness in all displacement directions. These designs also allow rotational motion with very low friction.

One of the difficulties with high temperature superconductor bearings is that the levitation pressure derived from structures obtained by most processing methods is relatively low. To achieve high levitation pressure, expensive processing methods must be used that enable large crystals of high temperature superconductors to be grown. For the same critical current density, the magnetization of a high temperature superconductor is proportional to the linear size of the crystal. From investigations of different high temperature superconductor materials, it was discovered that magnetic stiffness in high temperature superconductor materials is substantially independent of crystal size if the amplitude over which the stiffness is calculated is relatively small, e.g., of the order of a millimeter. Thus under these conditions, if the high temperature superconductor is used primarily for stiffness purposes, less expensive processing methods can be used.

In further experiments, it was determined that the rotational loss between a permanent magnet and a high temperature superconductor decreases as the levitation height increases. Since these bearings are often cooled while in use in the field, there is some range of choice in the levitation height. However, large levitation pressures require low levitation heights to be realized. Because relatively low levitation pressures are required by the preferred embodiments of the invention, rotational losses can be reduced by increasing the levitation height of the permanent magnet over the high temperature superconductor.

Gas centrifuge designs are well known, and these designs often employ magnetic bearings (see S. Whitlow, "Review of the gas centrifuge until 1962," Rev. Mod. Phys., Vol. 56, pp. 67–97, 1964.) To overcome the inherent instability in these bearings, a pivot bearing is often employed as shown in FIG. 1A. In this design, the magnetic bearing provides most of the levitational force but is axially unstable while being radially stable. The mechanical pivot bearing at the bottom provides both axial and some additional radial stability. This design locates the rotor close to the support so that the magnetic bearing clearance is small, but not so close that a minor perturbation will cause the rotor to jump up and attach to the magnet. This pivot is very stiff; however, in high-speed machinery applications, the bearing wears and provides a source of frictional loss.

These disadvantages have prevented diurnal energy storage and other high energy efficiency applications using superconducting bearings from being economically feasible.

It is therefore an object of the invention to provide a novel low-loss bearing and method of use that can be used to achieve a high-efficiency flywheel energy storage device.

It is a further object of the invention to provide an improved passively stable bearing and method of use in which a substantial portion of the levitation force is carried by the interaction of two or more permanent magnets while a substantial portion of stabilization forces are provided by a high temperature superconductor structure.

It is a still further object of the invention to provide low drag force in a novel magnetic bearing comprising a permanent magnet and a high-temperature superconductor.

It is yet another object of the invention to provide an improved magnetic bearing and method of use having reduced rotational losses.

It is a further object of the invention to provide a novel magnetic bearing and method of use including a high temperature superconductor structure located a relatively large distance away from a rotor to provide stabilization forces while reducing rotational losses.

It is a still further object of the invention to provide an improved superconducting magnetic bearing and method of use including a combination of permanent magnets pushing and pulling on a rotor structure to provide levitation force.

It is yet another object of the invention to provide a novel superconducting magnetic bearing and method of use using a superconductor structure exclusively as a passive stabilizer located at a distance away from a rotor sufficient to provide stabilization forces on the rotor without levitating the rotor.

It is another object of the invention to provide an improved superconducting magnetic bearing and method of use which reduce rotational losses due to magnetic field inhomogeneity.

Other advantages and features of the invention, together with the organization and the manner of operation thereof, will become apparent from the following detailed description when taken in conjunction with the accompanying drawings, wherein like elements have like numerals throughout the drawings.

DETAILED DESCRIPTION OF PREFERRED EMBODIMENTS

Figure 1A:
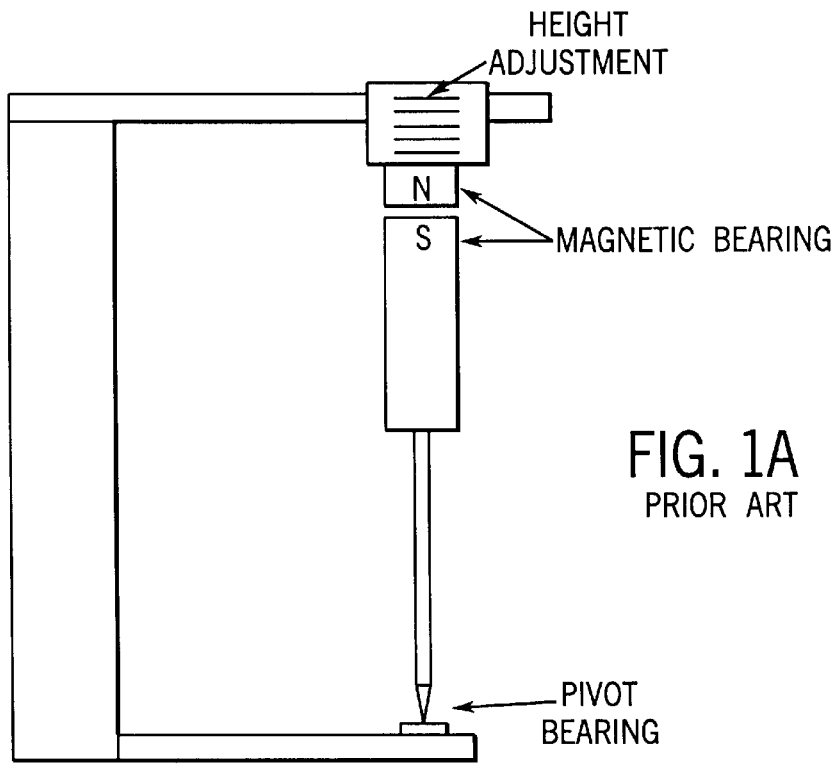
FIG. 1A illustrates a front elevation view of a prior art magnetic bearing including a mechanical pivot bearing.
Figure 1B:
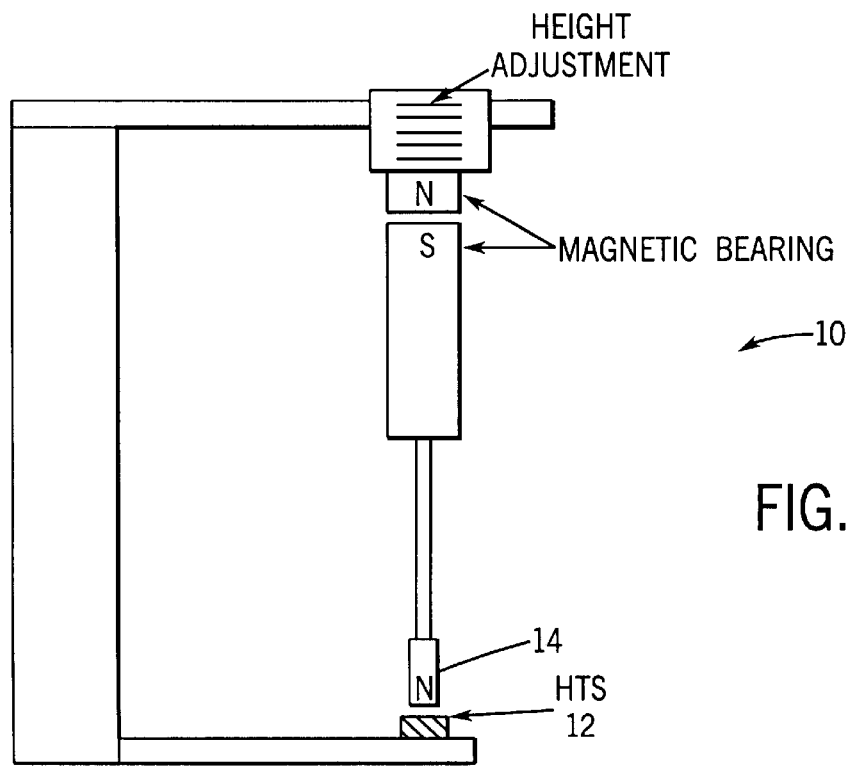
FIG. 1B shows a front elevation view of a magnetic bearing including a high temperature superconducting pivot bearing.

Referring to the figures, and more particularly to FIG. 1B, a preferred flywheel system incorporating magnetic bearings which utilize a permanent magnet and high temperature superconductors is illustrated at 10. In this high temperature superconductor bearing system 10 (hereinafter "bearing system 10"), a high temperature superconductor 12 and permanent magnet 14 replace a pivot bearing in a basic gas centrifuge design. The high temperature superconductor bearing system 10 provides both axial and radial stability, while eliminating all frictional losses characteristic of conventional pivot bearings. The high temperature superconductor bearing system 10 can also act to provide a small fraction of the levitation load in this embodiment.

Figure 2:
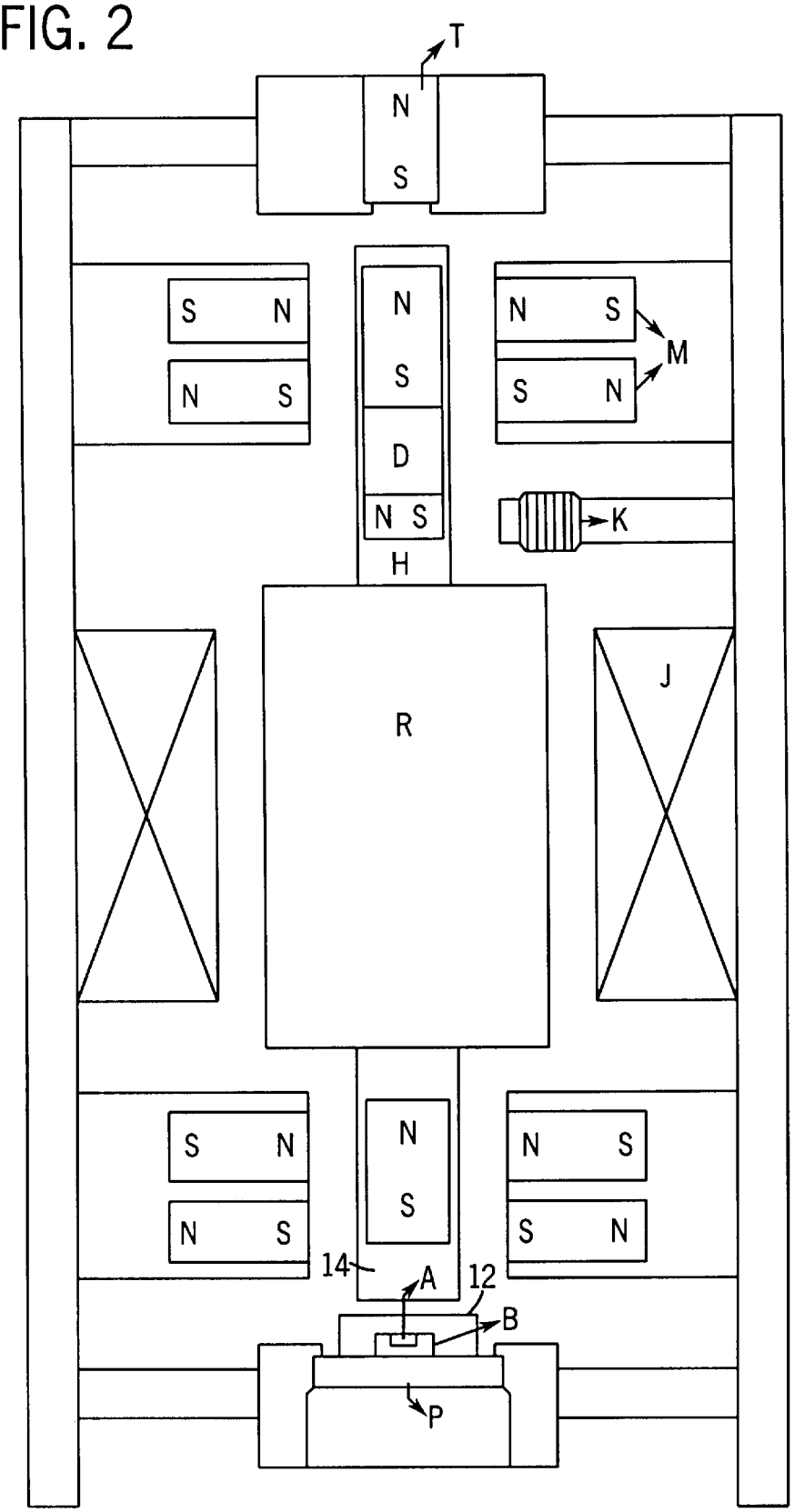
FIG. 2 illustrates another magnetic bearing including a high temperature superconducting structure.

An alternate embodiment is shown in FIG. 2, wherein the high temperature superconductor 12 and the permanent magnet 14 again replace the pivot bearing. FIG. 2 is a side view of the rotation instrument, wherein A represents the spindle and B represents a ruby bearing in a Teflon cap. D represents the inserted magnet. H represents the revolution indicating magnet. J represents the coils that produce a rotating magnetic field. K represents the pickup coil. M represents the suspension magnets. P represents the Teflon plate. R represents the aluminum rotor. T represents the auxiliary supporting magnet. Essentially, a configuration which utilizes a set of magnetic bearings with one or more mechanical pivot bearings can often operate with the pivot bearing replaced by a high temperature superconductor bearing. However, conventional high temperature superconductor bearing designs still incur rotational losses due to eddy currents. These losses are minimized by high temperature superconductor bearings constructed in accordance with the invention.

Figure 3:
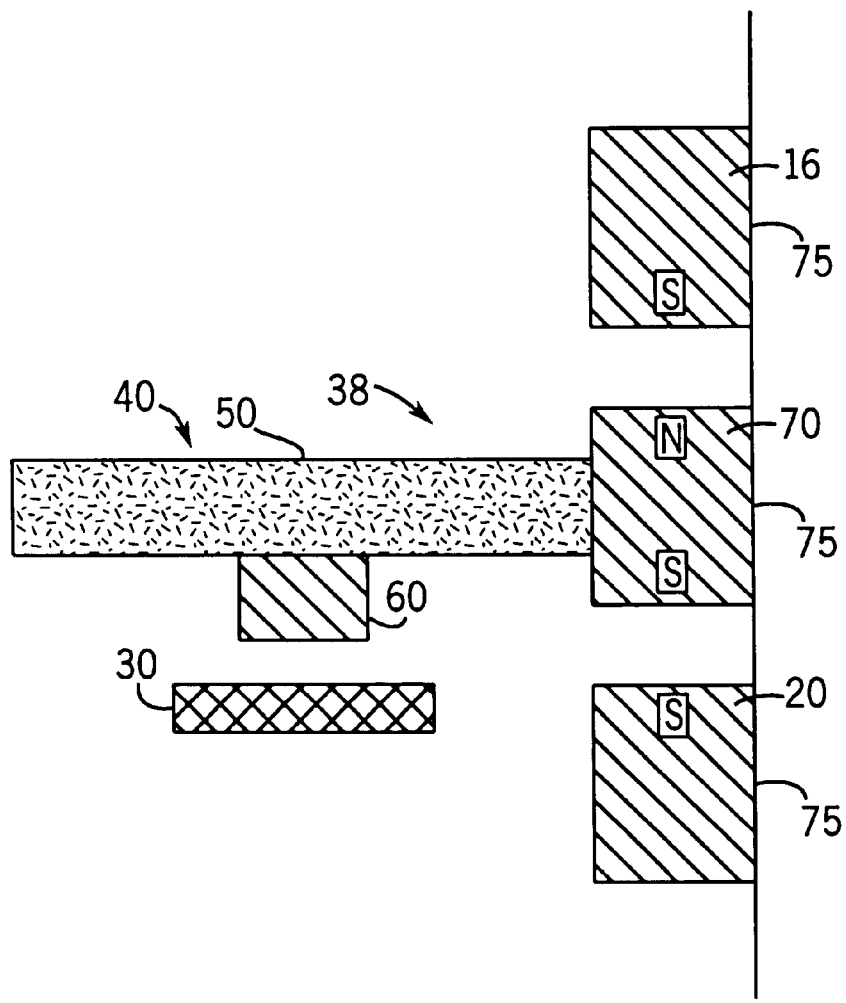
FIG. 3 shows a magnetic bearing using a superconductor structure acting as a passive stabilizer.

A preferred embodiment of one form of the invention is shown as flywheel system 38 in FIG. 3. A flywheel 40 preferably comprises a nonmagnetic rotor 50, a ring permanent magnet 60, and a cylindrical permanent magnet 70. The rotor 50 can comprise stainless steel, a composite material such as Kevlar or carbon-carbon composite, or other durable material. Upper permanent magnet 16 interacts with rotor permanent magnet 70 to levitate the flywheel 40 with an attractive force. Another permanent magnet combination comprises a lower permanent magnet 20 interacting with rotor permanent magnet 70 to levitate the flywheel 40 with a repulsive force. These permanent magnet arrangements can be denoted as a push/pull bearing 75. The ring permanent magnet 60 is stably levitated over a high temperature superconductor structure 30. The ring permanent magnet 60 and the high temperature superconductor structure 30 are field cooled and, if needed, can provide some levitation forces in addition to stabilization forces. While applications of permanent magnets in the flywheel system 38 are discussed herein, other types of magnets can be generally used equivalently. It should be noted that in FIG. 3, support means for the stationary components (upper permanent magnet 16, lower permanent magnet 20 and the high temperature superconductor structure 30) is not shown, nor is power I/O means, and other auxiliary components of a flywheel system, as these components are well known to one of ordinary skill in the art.

An important advantage of the flywheel system 38 shown in FIG. 3 is that the stiffness of the push/pull bearing 75 is very small. The high temperature superconductor structure 30 need not provide high levitation pressure. In some preferred embodiments, the high temperature superconductor structure 30 can be designed so as not to provide any levitation pressure. Further, the stiffness of the high temperature superconductor structure 30 interacting with the ring permanent magnet 60 for small amplitudes is independent of the levitation pressure and crystal size of the high temperature superconductor structure 30. For example, over amplitudes of about 1 millimeter, the stiffness of the high temperature superconductor structure 30 will remain substantially constant regardless of levitation pressure and the crystal size of the material. Thus, lower performance quality and, therefore, less expensive high temperature superconductor material can be used. The interaction of the high temperature superconductor structure 30 with the ring permanent magnet 60 provides positive stiffness in all directions.

A highly preferred embodiment includes a suspended flywheel system 38 slightly larger than the maximum force of the push/pull bearing 75, and the flywheel system 38 is able to operate the push/pull bearing 75 in a radially stable mode, i.e., slightly above the midplane of the push/pull bearing 75. The interaction between the high temperature superconductor structure 30 and the ring permanent magnet 60 supplies about 1% or so of the total levitation force. With only low levitation pressure required between the high temperature superconductor structure 30 and the ring permanent magnet 60, the gap therebetween can be relatively large. This structure makes control of magnetic field inhomogeneities easier and reduces the rotational losses associated with the high temperature superconductor structure 30.

Figure 4:
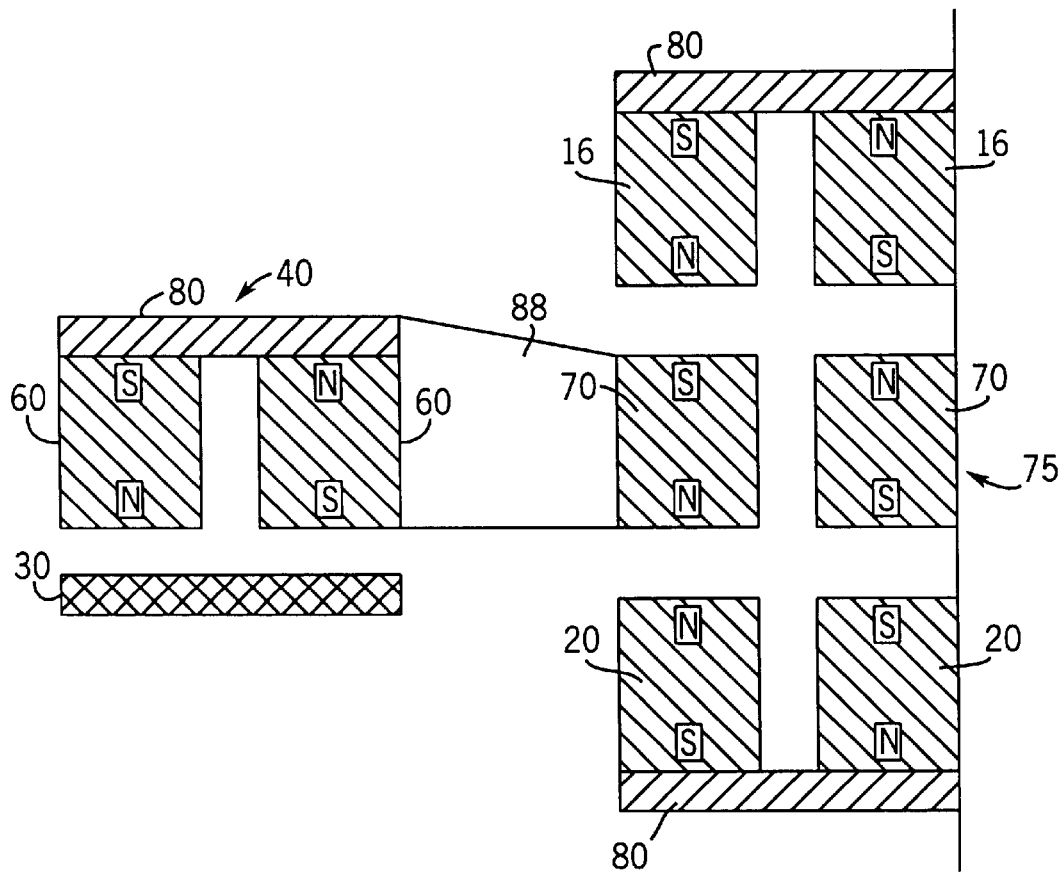
FIG. 4 illustrates a magnetic bearing design having concentric magnets and a magnetic flux return shunt.

As shown in FIG. 4, alternative embodiments based on the geometry of FIG. 3 include a ring-shaped push/pull bearing 75. Each of the permanent magnets 16, 20, 60 and 70 can be in the form of a set of concentric rings, as shown in cross-section in FIG. 4, with a permendur cap 80 or other high magnetic permeability material acting as a magnetic flux return path for the permanent magnets 16, 20 and 60. Such a return path is not required for the permanent magnet 70. A nonmagnetic material structure 88 couples the permanent magnets 60 and 70 for rotation adjacent the stationary permanent magnets 16 and 20 and the high temperature superconductor structure 30.

Figure 5:
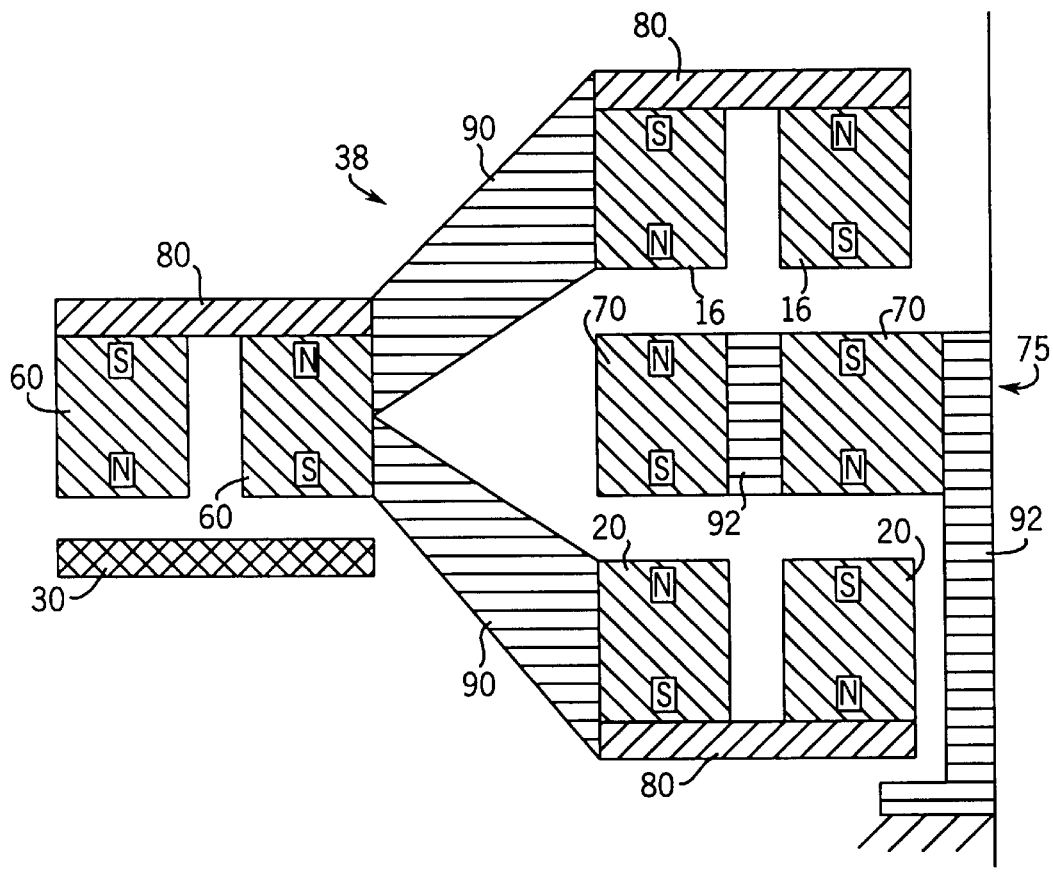
FIG. 5 shows a magnetic bearing design using an alternate levitation structure.

Another alternative embodiment of the invention is shown in cross-section in FIG. 5. FIG. 5 shows a basic push-pull magnetic bearing design with concentric magnets and a magnetic flux return shunt. It should be noted That the polarity of the permanent magnet 70 is reversed, compared to the permanent magnet 70 shown in FIG. 4. Each of the permanent magnets 16, 20, 60 and 70 are preferably concentric rings. Nonmagnetic coupling structure 90 couples permanent magnets 16, 20 and 60 for rotation adjacent stationary permanent magnet 70 and the high temperature superconductor structure 30. Nonmagnetic support structure 92 supports the magnet 70 adjacent permanent magnets 16 and 20. In this embodiment, alternating polarity opposite that shown in FIG. 4 (as shown in FIG. 5) yields satisfactory results.

Each of the permanent magnets 16, 20, 60 and 70 can be vertically laminated or otherwise modified to reduce field inhomogeneity. It was discovered that alternating the polarity of the concentric ring permanent magnets 16, 20 and 60 and coupling them with a magnetic shunt or flux return path, such as the permendur cap 80, substantially enhanced levitation forces by a factor of about fifty percent over the same configuration using matching polarity rings without the magnetic shunt. Thus, the alternating polarity concentric ring permanent magnets 16, 20 and 60 shown in FIG. 4 (which can be "nested" inside each other if desired) are highly preferred embodiments of the invention.

Accordingly, a major advantage of the invention is that the material of the high temperature superconductor structure 30 need not give rise to a high levitation pressure. This allows less expensive processing methods to be used in making high temperature superconductor bearing materials. If the high temperature superconductor part of the bearing system 10 does not have to support much of the flywheel weight, then the ring permanent magnet 60 can levitate higher over the high temperature superconductor structure 30, and the rotational loss associated with inhomogeneities in the ring permanent magnet 60 will produce less rotational loss than if the high temperature superconductor structure 30 had to support all of weight of the flywheel 40.

While there have been disclosed what are considered to be the preferred embodiments of the present invention, it is understood that various changes in details may be made without departing from the spirit and scope of the invention, or sacrificing any of the advantages of the present invention.

What is claimed is:

1. A high temperature superconductor material bearing, comprising:

a rotor including a permanent magnet structure;

a plurality of permanent magnet means for interacting with said permanent magnet structure of said rotor to provide a majority of levitation forces required to levitate said rotor; and a high temperature superconductor stabilizer means for interacting with said permanent magnet structure of said rotor to provide stabilizing forces for stable rotation of said rotor.

2. The bearing as defined in claim 1, wherein said permanent magnet structure of said rotor comprises a first portion and a second portion, said first portion interacting with said plurality of permanent magnet means and said second portion interacting with said high temperature superconductor stabilizer means.

3. The bearing as defined in claim 2, wherein a nonmagnetic structure couples said first portion and said second portion.

4. The bearing as defined in claim 2, wherein at least one of each of said first portion and said second portion comprises concentric magnetic rings coupled by a magnetic shunt.

5. The bearing as defined in claim 2, wherein said first portion and said second portion comprise concentric magnetic rings.

6. The bearing as defined in claim 1, wherein said rotor further includes a nonmagnetic structure.

7. The bearing as defined in claim 1, wherein at least one of said plurality of permanent magnet means is located vertically above said permanent magnet structure and exerts a pulling force thereon, and at least another one of said plurality of permanent magnet means is located vertically below said permanent magnet structure and exerts a pushing force thereon.

8. A method of suspending a rotor for rotation in a high temperature superconductor material bearing, comprising the steps of:

providing a rotor including a permanent magnet structure;

providing levitation forces necessary to levitate said rotor by locating a plurality of permanent magnets adjacent said permanent magnet structure; and locating a high temperature superconductor structure at a distance from said permanent magnet structure sufficient to provide stabilizing forces upon said high temperature superconductor structure while minimizing rotational losses due to magnetic field inhomogeneity.

9. The method as defined in claim 8, wherein said permanent magnet structure of said rotor comprises a first portion and a second portion, said first portion interacting with said plurality of permanent magnet means and said second portion interacting with said high temperature superconductor stabilizing means.

10. The method as defined in claim 9, wherein a nonmagnetic structure couples said first portion and said second portion.

11. The method as defined in claim 9, wherein at least one of said first portion and said second portion comprises concentric rings coupled by a magnetic shunt.

12. The method as defined in claim 8, wherein said rotor further includes a nonmagnetic structure.

13. The method as defined in claim 8, wherein at least one of said plurality of permanent magnet means is located vertically above said permanent magnet structure and exerts a pulling force thereon, and at least another one of said plurality of permanent magnet means is located vertically below said permanent magnet structure and exerts a pushing force thereon.

14. A high temperature superconductor bearing having a microstructure grain size, comprising:

a rotor having an included permanent magnet structure;

a plurality of permanent magnet means for interacting with said permanent magnet structure; and a high temperature superconductor stabilizer means for providing a magnetic stiffness which is substantially independent of the microstructure grain size for displacements of the stabilizer means of less than about 1 millimeter.

15. A high temperature superconductor material bearing, comprising:

a rotor including a permanent magnet structure;

a plurality of permanent magnet means for interacting with said permanent magnet structure of said rotor to provide a majority of levitation forces required to levitate said rotor, said permanent magnet structure including a first portion and a second portion, said first portion interacting solely with said plurality of permanent magnet means and said second portion interacting solely with a high temperature superconductor stabilizer means to provide stabilizing forces for stable rotation of said rotor.

16. The bearing as defined in claim 15, wherein said first portion is located in a central portion of said rotor and said second portion is located at an outer portion of said rotor.

17. The bearing as defined in claim 15, wherein at least one of said plurality of magnet means is located vertically above said permanent magnet structure and exerts a pulling force thereon, and at least another one of said plurality of permanent magnet means is located vertically below said permanent magnet structure and exerts a pushing force thereon.

18. The bearing as defined in claim 15, wherein said plurality of permanent magnet means interact with said permanent structure to provide greater than 95 percent of the levitation forces required to levitate said rotor.

* * * * *